(No Model.)
W. J. HOPKINS.
DUST PAN.
No. 572,343. Patented Dec. 1, 1896.
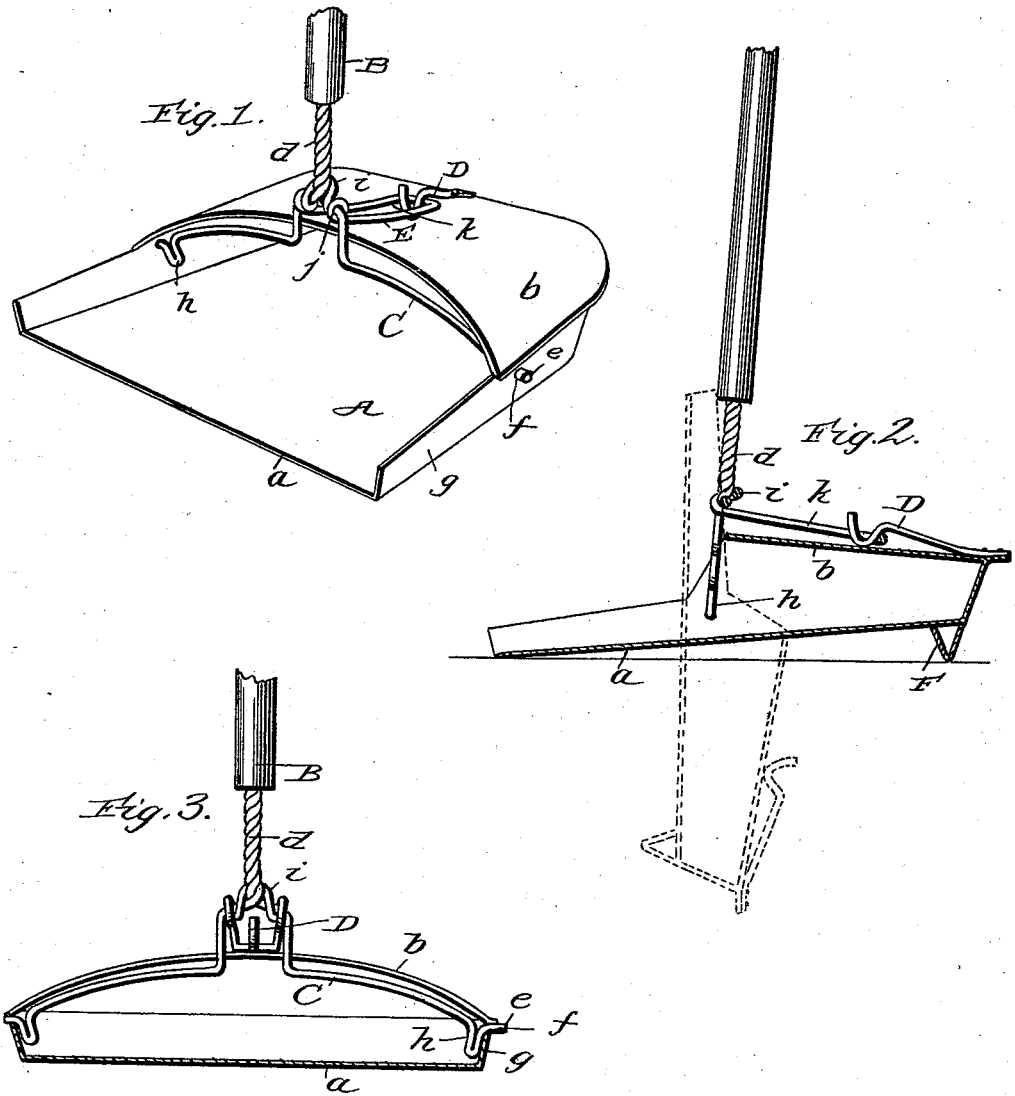
Witnesses:
C. H. Raeder
V. J. Beach
Inventor
W. J. Hopkins
By James Sheehy
Attorney

United States Patent Office.

WALTER J. HOPKINS, OF ST. CLAIR, MICHIGAN.

DUST-PAN.

SPECIFICATION forming part of Letters Patent No. 572,343, dated December 1, 1896.

Application filed February 24, 1896. Serial No. 580,466. (No model.)

*To all whom it may concern:*

Be it known that I, WALTER J. HOPKINS, a citizen of the United States, residing at St. Clair, in the county of St. Clair and State of Michigan, have invented certain new and useful Improvements in Dust-Pans; and I do declare the following to be a full, clear, and exact description of the invention, such as will enable others skilled in the art to which it appertains to make and use the same.

This invention relates to improvements in that class of dust-pans having means for staying the pan in a convenient position to receive dust and the like and adapted to trip and tilt the pan so that the dust collected will be prevented from spilling or falling out while being carried to the place of deposit, and its novelty will appear from the following description and claim when taken in connection with the accompanying drawings, in which—

Figure 1 is a perspective view of a dust-pan with my improvements applied and the handle partly broken away. Fig. 2 is a longitudinal sectional view illustrating in dotted lines the pan in the position which it is caused to assume when the collected dust is to be carried to a place of deposit, and Fig. 3 is a vertical transverse section taken in a plane at right angles to Fig. 2 and illustrating the pan in the same position as Fig. 1.

Referring by letter to said drawings, A indicates the pan proper, and which may be of the construction usually employed, having the base $a$ and the rear hood or crown-plate $b$.

B indicates the handle, which may be of wood, of any suitable length, and is preferably provided at its lower end with a socket to receive the shank or stem of a bail, which is here shown as composed of twisted wire.

C indicates the bail. This bail is composed of a piece of stout wire or other suitable material wrapped upon itself, as shown at $d$, so as to form the shank or stem, and is adapted to enter a socket in the lower end of the handle B or be secured thereto in any suitable manner. The ends of this wire from the lower end of the shank are carried laterally in opposite directions and preferably in a curvilinear manner, as shown, above and across the pan in advance of the hood, and its ends, which terminate in journals $e$, pass through holes or alined apertures $f$ in the vertical or flared side walls $g$ of the pan.

By reason of the pan having its greater weight at the rear, consequent to the employment of the hood, the journal-apertures may be midway or about midway of the length of the pan or side walls thereof, so that when the loop or link, which will be presently described, has been released from the catch on the hood or rear of the pan said pan will drop or swing into the position shown in dotted lines, Fig. 2, of the drawings. The wire forming the bail is bent or kinked at a sufficient distance from each end, as shown at $h$, so as to form stops to engage the inner sides of the side walls of the pan and thereby prevent said bail from slipping or working out of the journal-apertures when in use.

D indicates a spring-catch. This catch is arranged centrally on the rear upper side of the pan or hood thereof and is composed of a piece of spring metal fixed at its rear end to the hood and having its opposite or forward end curved forwardly, downwardly, and upwardly, so that the downward curve will impinge on the hood or nearly touch the same and permit the loop or link to pass beneath said loop or bend and engage the same when forced rearwardly, and will permit a disengagement when forced or drawn forwardly, as will presently appear.

E indicates the loop or link, which may also be composed of wire or the like. In forming this loop of wire I take a piece of wire of suitable size and mesh and bend it at the point $i$ against the rear of the shank or stem $d$ and close to the lateral branches of the bail. I then turn each branch of said wire once or more around the bail-branches, as shown at $j$, so as to make the same rigid, after which I carry the wire rearwardly oblique, so as to form the angular or other suitable loop $k$.

Assuming the loop to be disconnected from the spring-catch and it is desirable to use the pan, it is simply necessary to place the pan on the floor or other support until the lug or base projection F on the rear under side thereof receives a bearing. By then bearing down on the handle the pan will be brought to the approximate position shown in Fig. 1, when the loop or link will be forced under and past the loop or bend of the spring D, and will stay the pan in such position while it may be manipulated by the operator. When a sufficient quantity of dust has been collected in the pan and it is desirable to carry the same to a place of deposit, all that is necessary is to incline the handle forwardly, when the link or loop will be drawn forwardly beneath the loop or bend of the spring-catch and will be disengaged from the spring-catch, and by then lifting the handle, and consequently the pan, the latter will swing into the position shown in dotted lines, and its contents will be prevented from falling out by the most careless handling, but will permit of the contents being quickly and conveniently discharged.

The improvements are very cheap and simple and may be attached to pans as at present manufactured at a comparatively small expense.

Having described my invention, what I claim is—

The combination of the pan having the hood and also having journal-apertures in its side walls, the handle, the bail having a shank secured in said handle and also having lateral branches terminating in journals which bear in the journal-apertures of the pan, the catch of resilient metal fixedly connected at its rear end to the pan and arranged above the hood thereof and having its forward end free and bent downwardly and upwardly to form a loop which normally presses against the hood, and the link having the portion $i$, straddling the shank of the bail and the eyes $j$, receiving the lateral branches of the bail and also having the rearwardly-extending loop $k$, designed to be automatically engaged by the catch, as and for the purpose set forth.

In testimony whereof I affix my signature in presence of two witnesses.

WALTER J. HOPKINS.

Witnesses:
T. D. BARRON,
C. H. RAEDER.